United States Patent [19]

Gasmena et al.

[11] Patent Number: 5,415,688
[45] Date of Patent: May 16, 1995

[54] WATER-BORNE POLYSILOXANE/POLYSILICATE BINDER

[75] Inventors: Roland L. Gasmena, Anaheim; Raymond E. Foscante, Yorba Linda, both of Calif.

[73] Assignee: Ameron, Inc., Pasadena, Calif.

[21] Appl. No.: 123,785

[22] Filed: Sep. 20, 1993

[51] Int. Cl.$^6$ .................................. C09D 5/10
[52] U.S. Cl. ........................ 106/2; 106/634; 106/287.3; 106/287.14; 106/287.13; 428/447; 524/262; 524/859
[58] Field of Search ............... 524/262, 859; 428/447; 106/639, 287.11, 287.14, 287.3, 2

[56] References Cited

U.S. PATENT DOCUMENTS

| | | | |
|---|---|---|---|
| 2,529,206 | 11/1950 | Winslow et al. | 117/62 |
| 2,905,562 | 9/1959 | Brown | 106/12 |
| 2,953,466 | 9/1960 | Brown | 106/39 |
| 3,009,829 | 11/1961 | Gouveia | 117/126 |
| 3,682,668 | 8/1972 | Fujita et al. | 106/74 |
| 3,810,843 | 5/1974 | Slusarczuk et al. | 106/287.11 |
| 3,893,864 | 7/1975 | Beers | 106/1 |
| 4,169,737 | 10/1979 | Burke, Jr. et al. | 106/308 |
| 4,184,880 | 1/1980 | Huber et al. | 106/15.05 |
| 4,230,496 | 10/1980 | Falcone, Jr. et al. | 106/14.21 |
| 4,239,539 | 12/1980 | Ginsberg et al. | 106/1.17 |
| 4,277,284 | 7/1981 | Ginsberg et al. | 106/1.05 |
| 4,466,832 | 8/1984 | Yoshimura et al. | 106/634 |
| 4,609,487 | 9/1986 | Burkhardt et al. | 252/315.5 |
| 4,822,420 | 4/1989 | Burkhardt et al. | 106/74 |

*Primary Examiner*—Mark L. Bell
*Assistant Examiner*—C. M. Bonner
*Attorney, Agent, or Firm*—Christie, Parker & Hale

[57] ABSTRACT

A protective coating is made by polymerizing in water an amino oxysilane having at least one primary amine group to control pH and water solubility, the amino oxysilane comprising a saturated or unsaturated hydrocarbon group containing up to 12 carbon atoms, and having multiple hydrolyzable side groups selected from the group consisting of alkyl, aryl, alkaryl, alkoxy and alkoxyalkyl groups having from 1 to 6 carbon atoms, where the number of repeating units of the oxysilane is in the range of from 1 to 3, and metal silicates comprising a cation from the group consisting of alkali metals and alkaline-earth metals, the metal silicate having multiple hydroxy side groups to facilitate polymerization.

19 Claims, No Drawings

WATER-BORNE POLYSILOXANE/POLYSILICATE BINDER

FIELD OF THE INVENTION

This invention relates to the formation of a high performance binder used in inorganic protective coatings that serves to enhance the weatherability, heat and chemical resistance of the coating and can be varied to provide a flat or glossy surface finish as well as a zinc rich composition.

BACKGROUND OF THE INVENTION

Protective coatings are needed to protect a variety of substrates from premature deterioration and failure due to the particular environment in which they are used. Such substrates include concrete, steel and other industrial building or structural materials that are typically used in environments well known for their corrosive, chemical, mechanical, thermal and atmospheric degradation. Such applications include steel structures used in industrial chemical processing plants, oil refineries, power plants, offshore drilling platforms and the like. To be effective in such applications, the protective coating should protect against a variety of conditions. It should be a corrosion barrier; should be weatherable, that is, resistant to ultraviolet light and other components of sunlight as well as environmental constituents; should be heat resistant; and should be chemically resistant.

The performance of a protective coating is greatly dependent on the resin system used as the binder for the composition. Coating binders have historically been chosen from the following categories of resins: epoxy, polyurethane, silicone, silicate, acrylic, vinyl, alkyd, chlorinated rubber and the like. Some of these generic classes require a high level of organic solvent to dissolve them and cannot be used in light of today's heightened environmental consciousness. Accordingly, the state-of-the-art in high performance coatings is defined primarily by epoxy, polyurethane, silicone and silicate binders.

Each of these resins are known for their individual unique characteristics. For example, an epoxy resin binder provides the properties of long-lived corrosion and chemical resistance. A polyurethane resin binder provides long-lived weatherability and appearance. A silicone resin binder provides long-lived heat resistance and weatherability. Silicate resin binders, when combined with zinc dust, provide long-lived corrosion resistance. However, each resin of this current class of binders is also characterized as having limited performance potentials in certain areas. Epoxy resin binders tend to cure slowly at temperatures below 10° C. and have poor weatherability properties. Polyurethane resin binders are moisture sensitive, derived from toxicologically hazardous polyisocyanates, and are known to retain their appearance for only three to seven years. Silicones require baking or high heat curing to achieve full performance and are marginal film formers.

True advancements in the state-of-the-art for protective coatings require substantial improvements in weathering (primarily ultraviolet resistance), heat resistance, chemical resistance, and corrosion control. Polysiloxane chemistry offers the potential for providing many of these advancements. Polysiloxane is defined as a polymer consisting of repeating silicon-oxygen atoms that imparts several advantages over previously used carbon-based polymer binders; one of these advantages being an enhanced chemical and thermal resistance due to the silicon-oxygen bond. Polysiloxane's polymer linkage is also transparent to ultraviolet light making it resistant to ultraviolet degradation. Finally, polysiloxane is not combustible and is resistant to a wide range of chemicals and solvents, including acids.

Exemplary of polysiloxane coating compositions is that described by Law et al in U.S. Pat. No. 4,113,665. Law discloses a process for making chemically resistant coatings by reacting, in an acid medium, trialkoxysilanes and silicone intermediates. The Law invention represented a major advancement in polysiloxane based coatings technology because it provided a means of providing ambient temperature curing of polysiloxane compositions. Conventional silicone compositions, on the other hand, required high temperature curing to achieve the full chemical and heat resistant properties of silicon.

Although the process disclosed in the Law patent provided the improvement of ambient temperature curing, it has certain inherent limitations. The use of an acid catalyzed reaction requires a prehydrolysis step that necessitates a considerable input of energy for an extended period of time, thereby increasing the manufacturing cost of such products.

Polysiloxanes produced by the Law process produce protective coatings that are limited to either semi-gloss or flat finishes. Further, the protective coating comprising the acid catalyzed polysiloxane must be marketed as a two-part product, requiring that each part be packaged, shipped, stored and sold separately. The use of such a two-part product requires that each part be combined immediately before application. Often it is desirable to have a coating composition in a single container for field applications where mixing of two parts may not be reliable. Also, a considerable amount of organic solvent thinning is required to apply such a protective coating comprising the acid catalyzed polysiloxane.

It is, therefore, highly desirable to provide a high performance protective coating binder composition affording improved protection from corrosion and attack by chemicals, solvents, weathering, and heat where the binder can be manufactured economically and cured quickly at ambient temperature. It is also desirable that the binder be water soluble to permit the use of a water soluble protective coating making both clean up and application easier without having to use volatile organic solvents as thinners. It is further desirable that the binder permit the use of a protective coating that can be provided as a one-package system.

SUMMARY OF THE INVENTION

A protective water-borne polysiloxane binder composition is prepared by combining:

(A) an amino oxysilane having at least one primary amine group of the general formula

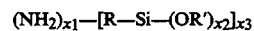

$$(NH_2)_{x1}-[R-Si-(OR')_{x2}]_{x3}$$

where R is a saturated or unsaturated hydrocarbon group containing up to 12 carbon atoms and where R' is independently selected from the group consisting of alkyl, aryl, alkaryl, alkoxy or alkoxyalkyl groups having 1 to 6 carbons and where $x_1$, $x_2$, and $x_3$ are in the range of from to 1 to 3;

(B) at least one metal silicate having the general formula

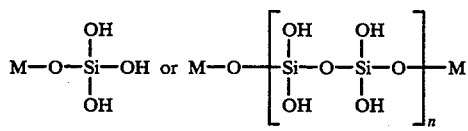

where M is selected from the group consisting of alkali metals and alkaline-earth metals, and where n is equal to 1 to 7, representing the degree of Si—O—Si bonding; and (C) water.

The binder composition is prepared by combining, in the preferred proportions, deionized water with the amino oxysilane and combining the amino oxysilane solution with at least one aqueous colloidal or metal silicate solution to form the binder mixture. The binder mixture undergoes hydrolysis and polymerization to form the binder composition. A preferred binder composition is prepared by combining in the range of from 25 to 50 percent by weight solids comprising amino oxysilane and metal silicate, and in the range of from 50 to 75 percent by weight water.

A preferred binder composition is prepared by combining in the range of from 5 to 15 percent by weight amino oxysilane, in the range of from 20 to 35 percent metal silicate and in the range of from 50 to 75 percent by weight water. The total water used to prepare the binder comprises water contained in the aqueous metal silicate solution and any free water added to the amino oxysilane. The water contained in the aqueous metal silicate may be sufficient to prepare the binder composition so that the addition of free water to the amino oxysilane is not needed. A preferred binder composition is prepared by combining in the range of from 50 to 60 percent by weight water as aqueous metal silicate solution and up to about 15 percent by weight free water. The oxysilane binder materials combined according to these proportions undergo hydrolysis and polymerization to form a water insoluble interlinking three dimensional polysiloxane network.

A coating composition may comprise the binder composition of the present invention in the range of from 5 to 85 percent by weight. A coating composition may also comprise in the range of from 15 to 95 percent by weight fillers, pigments, plasticizers, colorizers, flow control additives, solvents and other ingredients. However, if a transparent coating is desired, the coating composition may comprise 100 percent by weight binder.

Coatings containing these binders display a rapid cure rate and long-lived resistance to corrosion, weathering, heat, chemical attack, and solvent attack, including resistance to acids and salt water.

Coatings containing the binders of this invention can be supplied in a one-package system and can be applied directly to a surface to be treated. Such coatings can also be applied as a top coat over primers such as inorganic zinc silicate without application related bubbling. Additionally, the coatings can be applied by either spray or brush without need for organic solvent thinning.

These and other features, aspects and advantages of the present invention will become more apparent from the following description and appended claims.

DETAILED DESCRIPTION

Binders for preparing coatings resistant to attack by solvents, chemicals, heat and weathering have as significant components a water soluble amino oxysilane and at least one water soluble collodial or metal silicate for promoting polycondensation of the oxysilane and the formation of a water insoluble polymeric matrix. There may also be pigments, fillers, epoxies, plasticizers, and water-borne solvents in the coating composition. An exemplary binder composition is prepared by reacting in the presence of water:

(a) a water soluble amino oxysilane having the formula

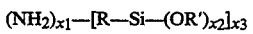
$(NH_2)_{x_1}-[R-Si-(OR')_{x_2}]_{x_3}$ where R is a saturated or unsaturated hydrocarbon group containing up to about 12 carbon atoms and where R' is an alkyl, aryl, alkaryl, alkoxy or alkoxyalkyl group having in the range of from about 1 to 6 carbons and where $x_1$, $x_2$ and $x_3$ are in the range of from 1 to 3, with;

(b) at least one water soluble metal silicate having the general formula

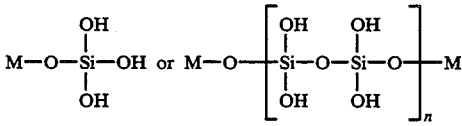

where M represents a cation selected from the group consisting of alkali metals and alkaline-earth metals and where n is from 1 to 7, representing the degree of Si—O—Si bonding.

With respect to the amino oxysilane it is desired that it comprise at least one primary amine group. The primary amine functionality of the amino oxysilane facilitates water solubility due to the affinity of the primary amine to hydrogen bond with the water. The primary amine functionality also serves to control pH, providing a sufficiently alkaline condition to facilitate the hydrolysis of the OR' groups and polycondensation of the amino oxysilane and metal silicate, and assures the solubility of the metal silicate. The ability to provide an alkaline condition using the primary amine functionality avoids having to use an alkali hydroxide such as sodium hydroxide or potassium hydroxide. Not having to use an alkali hydroxide is desirable because it eliminates the possibility of any alkali hydroxide ion trapped in the polysiloxane matrix from redissolving upon contact with moisture and causing damage to the coating.

It is desired that R be a saturated hydrocarbon group containing up to 12 carbon atoms. Practically speaking, binder compositions with an R group having more than 12 carbons will adversely affect the rate of hydrolysis and condensation of the amino oxysilane and metal silicate. This is believed to be due to the effect of steric hinderance and hydrophobicity of the aliphatic hydrocarbons. Further, binder compositions with an R group having more than 12 carbons will produce a coating composition that is too viscous for practical application. An amino oxysilane compound with an R group having at least 3 carbon atoms produces a binder composition having an acceptable hydrolysis and condensation rate and a desirable viscosity in the range of from about 1000 to 3000 centipoise (cP) at 25° C. Amino oxysilanes with an R group having less than 3 carbon atoms are very volatile, which ultimately affects the ability of the amino oxysilane to polymerize and form an interlinking three dimensional polysiloxane network.

A desirable amino oxysilane has an R' group selected from the group of saturated hydrocarbons having in the range of from 1 to 6 carbon atoms. A preferred R' group comprises an alkyl group selected from the group consisting of methyl, ethyl and n-propyl. An R' group selected from the methyl, ethyl and n-propyl group is desirable because such alkyl groups are relatively more soluble in water than longer chain hydrocarbons, thus, facilitate a quick hydrolysis of the OR' group and polycondensation of the metal silicate. Additionally, an R' group comprising a methyl, ethyl or n-propyl group yields a binder composition having a rapid cure rate due to the increased evaporation rate associated with the alcohol analogue of the alkyl groups formed during the hydrolysis of the amino oxysilane. Exemplary of such groups which R' can be in addition to the methyl, ethyl and n-propyl groups are iso-propyl, n-butyl, isobutyl and the like.

However, under certain conditions such as coating interior surfaces under high temperature operating conditions when low volatility is required, the R' group can be a higher molecular weight alkoxyalkyl group such as the methoxyethyl or ethoxyethyl group.

A desirable amino oxysilane has an $x_2$ of 3. An amino oxysilane having three hydrolyzable oxy substituents facilitates condensation with the metal silicate by providing numerous condensation sites. These numerous condensation sites facilitate the formation of a truly interlinked amino oxysilane-metal silicate polymeric network. It is also desirable that the $x_3$ be 1 in order to facilitate the rapid hydrolysis of the OR' groups and polycondensation with the metal silicate. An amino oxysilane having an $x_3$ greater than 1 may adversely affect the rate of hydrolysis and polycondensation due to the effect of steric hindrance and decreased water solubility.

With respect to the water soluble metal silicate, it is desirable that the metal be selected from the group consisting of alkali metals and alkaline-earth metals from the periodic table. Preferred alkali metals include lithium, potassium and sodium as these have been shown to provide the fastest binder cure rate. These metals are believed to enhance the binder cure rate due to their relatively high degree of water solubility and related reactivity. The alkali metals are also chosen for their alkalinity and their related effect on stabilizing the binder composition and preventing thickening and gelation of the colloidal silica contained in the metal silicate. If desired, the metal silicate solution may comprise collodial silica up the solubility limit.

The metal silicate solutions are maintained at a high pH, typically around 12, to ensure continued solubility, low viscosity, and to extend the shelf life of formulated compositions. This high pH can have adverse effects on the drying and curing properties of such compositions when they are applied under conditions of high relative humidity, where there is moisture condensation during the curing process, or when the freshly applied coating composition experiences early water contact. The fate of the metal component in the metal silicate is to react with atmospheric carbon dioxide to form a soluble metal carbonate which works out and away from the film during or soon after the curing process of the coating composition.

An exemplary metal silicate may comprise in the range of from 2 to 8 silicon atoms arranged in Si—O—Si bonding. The degree of Si—O—Si bonding is represented by n equaling from 1 to 7. A preferred metal silicate has an n equal to approximately 3. This degree of Si—O—Si bonding in the metal silicate produces a binder composition having an optimum cure rate and degree of hardness. Metal silicates having an n less than 3 tend to affect the degree of heteropolymerization of the binder mixture, producing a binder composition having an increased cure rate and reduced hardness. A metal silicate having an n greater than 3 tends to increase the likelihood of metal silicate homopolymerization, forming cyclic compounds instead of the desired interlinked polysiloxane network necessary to serve as a protective coating.

The binder is prepared by combining, in the preferred proportion, an amino oxysilane with at least one metal silicate and water. A preferred amino oxysilane is n-(trimethoxysilylpropyl) ethylenediamine which is readily available from Dow Corning and sold under the product name Z6020. A preferred metal silicate is potassium silicate which is readily available from DuPont under the product name Potassium Silicate 30. Potassium is selected as the preferred alkali metal because of its high reactivity, water solubility and low material cost. However, if desired, lithium silicate may also be added to the mixture to enhance cure speed. Relatively speaking, lithium is a more reactive alkali metal, and thus its use increases the rate of binder forming polycondensation between the amino oxysilane and the metal silicate. Lithium silicate is readily available from DuPont under the product name Polysilicate 48.

The preferred amino oxysilane is introduced into a suitable container and is mixed together with deionized water. The metal silicate is also combined with deionized water and mixed together to form an aqueous solution. The aqueous metal silicate solution is then added to the amino oxysilane mixture. The preferred proportion of solids to water combined to prepare the binder composition is in the range of from 25 to 50 percent by weight. Accordingly, in the range of from 50 to 75 percent by weight water is used to prepare the binder composition. Binder compositions comprising greater than about 50 percent by weight solids react to produce a binder that is unstable, forming an undesirable gel incapable of serving as a protective coating. Binder compositions comprising less than about 25 percent by weight solids react to produce a binder that has poor film forming properties.

The binder composition displays optimum cure rates when it is prepared by combining in the range of from 5 to 15 percent by weight amino oxysilane and in the range of 20 to 35 percent by weight metal silicates. A preferred binder composition is, therefore, produced when the metal silicates and the amino oxysilane are combined in the weight ratio of from about 2:1 to 7:1. A binder composition comprising greater than 15 percent by weight amino oxysilane reacts to produce a coating composition having an increased cure rate, decreased shelf life stability, decreased water solubility and a decreased time for hardness. A binder composition comprising less than 5 percent by weight amino oxysilane reacts to produce a coating composition having an increased time for water insolubility and an increased time for hardness. Economically, it is also advantageous that the binder composition not comprise greater than 15 percent by weight amino oxysilane since it is more costly than the metal silicate. Further, the proportion of amino oxysilane comprising the total solids of the binder composition is important to the hydrolysis reaction due to the autocatalytic properties of the amino oxysilane. The preferred binder composition is prepared using approximately 5 percent by weight amino oxysilane.

A binder composition comprising greater than 35 percent by weight metal silicate will react to produce a coating having an increased curing time, decreased shelf life and decreased water solubility. Due to the relatively low material cost of the metal silicate, it is not economically desirable that the ingredients used to prepare the binder composition comprise less than 20 percent by weight metal silicate. The preferred binder composition is prepared from a binder mixture comprising approximately 25 percent by weight metal silicate. The preferred binder composition is, therefore, prepared by combining the preferred metal silicates and amino oxysilane in the weight ratio of approximately 5:1.

Before combining the metal silicate with the amino oxysilane and water mixture, the metal silicate is itself combined with a proportion of deionized water to produce an aqueous metal silicate solution. The metal silicate is combined with an aqueous solution to optimize mixing between the amino oxysilane and the metal silicate.

The binder composition comprises in the range of from 50 to 75 percent by weight water. The total water used to prepare the binder composition comprises water used to produce the aqueous metal silicate solution and free water added to the amino oxysilane. The amount of water used to produce the aqueous metal silicate solution depends on the alkali metal or alkaline-earth metal selected for M. For example, an exemplary metal silicate solution when M is potassium comprises approximately 30 percent by weight potassium silicate and approximately 70 percent by weight water. However, an exemplary metal silicate solution with M equal to lithium may comprise a greater amount of the alkali metal because of the increased water solubility of lithium as compared to potassium. Accordingly, the lithium silicate solution may comprise approximately 40 percent by weight lithium silicate and approximately 60 percent by weight water.

The preferred binder composition comprises in the range of from 50 to 60 percent by weight water from aqueous metal silicate and up to 15 percent by weight free water. The preferred binder composition is produced using approximately 50 percent by weight water from aqueous metal silicate and approximately 10 percent by weight free water.

Preferably, the binder ingredients are combined at ambient temperatures to form the binder composition of the present invention. The binder ingredients will react to form the desired binder composition at temperatures from about 5° C. to 50° C. While a binder composition will still be formed at temperatures outside this range, its cure rate and degree of polymerization may adversely affect the binder's ability to protect a coated surface against weather, chemicals, heat and corrosion.

The binder composition is but one component used in making up a coating composition. A coating composition also contains other solid components such as pigments and fillers that tend to decrease the total water content of the coating composition. Optimum packaging or product shelf life has been shown to occur when the coating composition incorporating the binder composition comprises at least 48 percent by weight water.

While not wanting to be bound by any particular theory or mechanism, it is believed that the polysiloxane binder is produced in the following manner. Upon adding water to the amino oxysilane it is believed that one or more of the R' groups undergo an hydrolysis reaction forming an alcohol analogue of the R' groups and a hydroxy substituted amino oxysilane, see exemplary reaction (1).

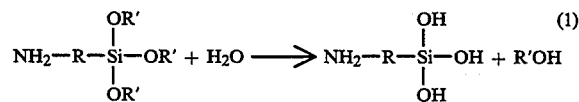

The hydroxy substituted amino oxysilane hydrolysis product then acts autocatalytically to promote heteropolymerization with other amino oxysilane molecules forming a primary amino siloxane polymer and an alcohol analogue of the hydroxy substituted R' groups; see reaction (2). In order to facilitate this heteropolymerization reaction it is preferred that more than one R' group undergo hydrolysis and substitution with a hydroxy group. Multiple hydroxy substitutions serve to facilitate heteropolymerization between the hydroxy substituted amino oxysilane and amino oxysilane by providing additional reaction sites.

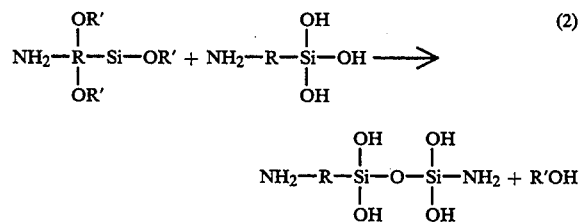

The hydroxy substituted amino oxysilanes also undergo homopolymerization with other hydroxy substituted amino oxysilanes through a polycondensation reaction forming a similar primary amino siloxane polymer and water; see reaction (3). The formation of the primary amino siloxane polymers are evidenced by an increase in viscosity of the mixture detected shortly after the water is added to the amino oxysilane.

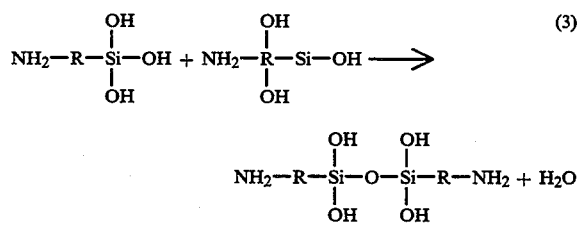

The hydrolysis of the amino oxysilane is driven to completion by the addition of water and the evaporation of the alcohol analog of the R' groups. However, the homopolymerization curing reaction of the metal silicate is initiated by the evaporation of water and is suppressed by the addition of water. Accordingly, the amount of water added to the binder composition represents a compromise between the completion of the amino oxysilane hydrolysis reaction and the suppression of the metal silicate. Practically speaking, a binder composition comprising water in the range of from 50 to 75 percent by weight of the total mixture allows a sufficient degree of hydrolysis and homopolymerization to produce the physical characteristic desired for the binder composition to perform as a protective coating.

An aqueous metal silicate solution is added to the amino oxysilane mixture, causing an initial decrease in viscosity. It is believed that the metal silicate undergoes heteropolymerization with the primary amino siloxane polymer through the polycondensation of the metal silicate, forming water and a three dimensional water insoluble interlinked polysiloxane network; see reaction (4). The formation of this three dimensional interlinked polysiloxane network is evidenced by an increase in viscosity shortly after the initial viscosity decrease upon addition of the metal silicate solution.

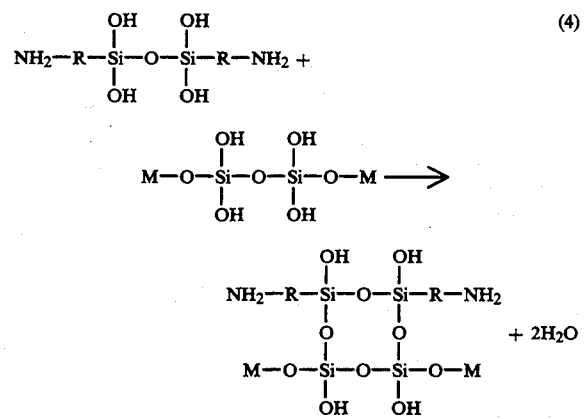

Like the homopolymerization shown in reaction (3), the heteropolymerization reaction of the metal silicate and formation of the polysiloxane network is suppressed by the addition of water. The metal silicate undergoes polymerization by first concentration through solvent water evaporation and then silanol condensation. The condensation reaction is driven by solvent water evaporation, resulting in a fully cured three dimensional polysiloxane structure. A binder composition prepared from a binder mixture comprising in the range of from 50 to 75 percent by weight water provides a sufficient degree of heteropolymerization to produce a binder composition having physical characteristics desired to perform as a protective coating.

In order to prepare a binder composition having optimum chemical and physical properties for a specific application, the weight ratios, molecular weight and degree of functionality of the reactants combined to prepare the binder composition are all varied within the ranges described above. The end uses of compositions made with combinations of amino oxysilanes and metal silicates include those where chemical and/or thermal resistance are important. Such compositions are also useful as weatherable top coats over other compositions and for preparing fast drying zinc silicate compositions.

Because the polymerization/polycondensation reactions that form the primary amino siloxane three-dimensional polysiloxane network are driven by the evaporation of water, a coating composition comprising such a binder may not impart the desired corrosion resistant protective coating under conditions of extreme moisture or when applied to substrates subjected to wet environments. In such applications, excess moisture would prevent the binder from forming the polysiloxane network needed to impart the desired corrosion resistant protective coating. Of course, the coating composition will impart the desired corrosion resistant properties if the substrate can be isolated or removed from the moist condition for a sufficient time to permit the complete curing and polymerization of the polysiloxane.

Empirically, this base-catalyzed water borne reaction proceeds faster than that of a base-catalyzed organic solvent based reaction. This is believed due to the autocatalytic effect of the amino oxysilane in facilitating the heteropolymerization and homopolymerization reactions shown in reactions (2) and (3). The tendency for chain extension and cross-linking during the homopolymerization/polycondensation reaction forming the primary amino siloxane polymer and heteropolymerization/polycondensation reaction forming the three dimensional interlinked polysiloxane network is not equally favored throughout the reaction span. The heteropolymerization/polycondensation reaction of the primary amine siloxane polymer and the metal silicate is kinetically favored due to the synergistic effect of the multiple hydroxy substituents of the primary amino siloxane polymer and the highly reactive/relatively lower molecular weight metal silicates, sterically favoring the rapid formation of a truly three-dimensional interlinked polysiloxane network.

Once exposed to the atmosphere, the hydrolysis and polycondensation reactions are driven by the evaporation of water, thereby driving the equilibrium towards heteropolymerization/polycondensation of the amino siloxane polymer and the metal silicate. The end product is a thoroughly cross-linked structure of Si—O—Si, Si—O—Si—OH or Si—O—Si—NH$_2$, and Si—O—Si—O—M bonds.

An advantage of using a water-borne polysiloxane binder in a coating composition is that organic solvent thinning is not required for application. This is due in part to the low molecular weight, and thus low viscosity of the polymer precursors. More notably, however, is the fact that the polymeric precursors are water soluble, eliminating the need for any organic solvent. A sprayable, organic solvent-free composition is readily prepared. Clean up of the coating composition can also be accomplished without the use of an organic solvent as long as the coating has not thoroughly cured. A coating composition containing the water-borne binder may require water thinning to facilitate application if such coating contains high proportions of fillers, pigments, etc.

It is desirable that a coating composition containing the binder composition of the present invention be dry to touch in less than about an hour and substantially completely cure overnight (i.e. in less than about eighteen hours). Dry to touch times longer than about an hour are generally unsatisfactory because the coated surface cannot be handled for subsequent processing steps until the coating has dried or set. In addition, a wet coating is easily contaminated with dust particles or damaged by early water contact. Preferably a coating takes longer than about a half hour to dry because if the coating drys too fast, an uneven surface results, especially in overlap areas.

The suitability of a coating composition comprising the water-borne binder often depends upon the amount of water present. Generally, increasing the amount of water present lengthens cure time, lengthens shelf life, and decreases the viscosity of the reactants/solvent mixture. An amount of solvent which allows drying to occur in the range of from one-half to one hour is preferred.

The amount of water used to prepare the binder composition is a balance between the competing considerations of providing a binder product with sufficiently low viscosity that it can easily be applied to surfaces and at the same time provide a binder product with high solids content so that a thick film can be quickly formed. An advantage of a water-borne binder product is that its low viscosity permits spray application with little or no thinning. Additionally, if thinning is desired it can be done with water instead of using an organic solvent.

Coating compositions of this invention comprise not only a binder as described above, but may also comprise fillers. Conventional fillers can be used in the coatings. These include silica powder, talc (magnesium silicate), clays such as china clay (aluminum silicate), wollastonite (calcium silicate), calcium carbonate, barites (barium sulfate, barium metaborate), aluminum trihydrate, aluminum oxide, graphite, zinc, aluminum, copper and the like. The water-borne binder system comprises a greater hydroxyl density than that of an organic solvent based binder system. When used for forming a zinc containing corrosion resistant coating, the greater hydroxyl density facilitates a high degree of zinc loading in the interlinked polysiloxane network, forming more zinc silicate groups in the dried coating film, which enhances the protective capacity of the coating.

Pigments such as iron oxide, aluminum oxide, titanium dioxide, and chrome green may also be used. Pigments containing lead should be avoided because of interference with cure. Organic pigments such as hansa yellow, phthalo green, and phthalo blue may also be used to color the product. Zinc oxide can also be used to aid film hardening. Barium metaborate is a preferred filler when the resistance to acids is desired because it has been found that coating compositions containing barium metaborate exhibit improved resistance to attack by acid.

When a coating exhibiting resistance to high temperatures is desired, a finally divided, particulate pigment or filler can be used. Exemplary of such fillers providing high heat resistance are barites (barium sulfate), mica, micaceous iron oxide, aluminum flake, aluminum oxide, calcined alumina, glass flake, stainless steel flake, and the like. By proper selection of the binder and filler, heat stable coatings resistant to temperatures exceeding 1000° F. can be achieved.

As the ratio of binder to filler in a coating composition increases, the coating strength increases, and its adhesion to surfaces increases. The coating comprises preferably at least 5% by weight of the binder so the coating has sufficient strength and resistance to attack by chemicals, solvents, heat, and weathering to protect the underlying surface. Preferably less than 85% by weight of the binder is used so that a sufficient amount of pigment or filler may be used to impart a desired degree of high temperature resistance to the coating composition.

Other materials commonly used in coating compositions may also be included. For example, the coating composition may include plasticizers for the binder such as esters or silicone oils. Flow control additives, wetting agents for pigment dispersion, and thixotropic agents such as fumed silica may also be included.

The binder composition of the present invention is also compatible and will copolymerize with other water soluble resin systems. For example, the binder composition will readily copolymerize with emulsified epoxies to form an interlinking polysiloxane-epoxy network. The copolymerization is believed to result from the reaction between the epoxy and the primary amine of the amino oxysilane. The copolymerization permits the formation of a coating composition having increased ductility over coatings not containing the copolymerized product, permitting the use of such a coating in applications where the object being coated undergoes a bending, twisting or flexing action to some degree.

The degree of prehydrolysis is not critical to the formulation of this binder. The more important factor is the proportion of amino oxysilane contained in the binder mixture due to its autocatalytic properties. The packaging and shelf life of the coating composition is controlled by the water content of the system. Preferably, a coating composition comprising at least 48 percent by weight water produces a curing system which has good adhesion to most surfaces, dries to touch in the preferred drying time of from one half to one hour, cures overnight, has a shelf-life of at least six months and has sufficiently high thixotropy that it can be applied to vertical surfaces.

A water-borne binder composition can be prepared and stored in a single container because of the low viscosity of the mixture and its inherent stability. It may be preferable to employ a two-container composition, however, when the filler loading is relative high. Pigments and the like may settle and be hard to resuspend in a single container. Thus, it may be preferable to store the pigments and the like in one container and mix them with the binder composition shortly before use.

Coatings containing the binder composition of the present invention can be used for treating materials to protect them from weathering, solvents, including hydrocarbon solvents, salt water, chemicals such as sulphur dioxide, and heat. Illustrative of materials which can be treated are concrete; vitreous surfaces; and metallic surfaces such as the interior surfaces of petroleum tanker tanks used for carrying refined and unrefined petroleum, the interior surfaces of boiler stacks such as coal fired power plant stacks, and surfaces of offshore drilling platforms. Coatings containing the binder composition can also be used to protect other coatings such as inorganic coatings containing metallic zinc used to protect metallic surfaces from corrosion. When so used the coating with inorganic zinc provides corrosion resistance while the over or top coat containing a binder of this invention protects the inorganic zinc coating from chemical attack.

Coating compositions containing the binder of this invention can be applied to a surface to be treated by conventional techniques such as spraying or brushing. Curing occurs through the hydrolysis and polymerization/polycondensation reactions that are driven to completion by the evaporation and water. The coatings can be applied to new construction and over inorganic primers such as inorganic coatings containing anticorrosion pigments such as metallic zinc.

Coatings containing the binder of this invention are usually applied in films of from about 25 to 250 micrometers or in some embodiments up to about 2 millimeters in thickness. If necessary, multiple layers can be applied to the surface to be protected. The preferred dry film thickness is from about 25 to 125 micrometers for a quick drying, fast curing film to provide good protection to the underlying surface.

These and other features of the present invention will become more apparent upon consideration of the following binder compositions shown in Table 1.

EXAMPLES 1–20

The binder compositions shown in Table 1 are typical embodiments of this invention as contained in a zinc coating composition. The binder compositions are typically prepared by mixing together the amino oxysilane with water and then combining the mixture with the aqueous metal silicate solutions until a fine dispersion is achieved. The parts by weight of each reactant for each example is shown in the Typical Composition portion of Table 1. The parts by weight of each component is varied within the preferred weight percent ranges for each component. The binder composition in each example has been varied in some manner to affect a particular property as shown in the Physical Properties portion of Table 1.

TABLE 1

| | Typical Composition (parts by weight) | | | |
|---|---|---|---|---|
| Example | Amino Oxysilane | Metal Silicate A | Metal Silicate B | Water |
| 1 | 37.5 | 200 | 100 | 25 |
| 2 | 26.25 | 250 | 75 | 12.5 |
| 3 | 26.5 | 250 | 75 | 37.5 |
| 4 | 60 | 200 | 100 | 25 |
| 5 | 26.25 | 250 | 125 | 12.5 |
| 6 | 26.25 | 250 | 125 | 24 |
| 7 | 37.5 | 200 | 100 | 50 |
| 8 | 37.5 | 200 | 100 | 12.5 |
| 9 | 15 | 200 | 100 | 25 |
| 10 | 37.5 | 200 | 100 | 0 |
| 11 | 37.5 | 200 | 50 | 25 |
| 12 | 48.75 | 250 | 120 | 37.5 |
| 13 | 48.75 | 250 | 125 | 12.5 |
| 14 | 37.5 | 200 | 100 | 25 |
| 15 | 37.5 | 200 | 100 | 25 |
| 16 | 37.5 | 300 | 100 | 25 |
| 17 | 37.5 | 200 | 150 | 25 |
| 18 | 26.25 | 150 | 125 | 37.5 |
| 19 | 48.75 | 150 | 75 | 37.5 |
| 20 | 37.5 | 100 | 100 | 25 |

| | Physical Properties | | | | |
|---|---|---|---|---|---|
| Example | Dry Touch (minutes) | Dry Hard (minutes) | Viscosity (cP) | Stability Percentage | Water Insolubility (minutes) |
| 1 | 5 | 20 | 26 | 86.7 | 200 |
| 2 | 5 | 20 | 25 | 83.4 | 145 |
| 3 | 5 | 25 | 15 | 60.0 | 160 |
| 4 | 1 | 15 | 80 | 47.5 | 100 |
| 5 | 5 | 30 | 34 | 87.0 | 142 |
| 6 | 15 | 30 | 15 | 75.0 | 135 |
| 7 | 19 | 30 | 14.5 | 96.0 | 370 |
| 8 | 1 | 15 | 80 | 47.5 | 100 |
| 9 | 5 | 26 | 15 | 75.0 | 300 |
| 10 | 5 | 22 | 68 | 91.8 | 420 |
| 11 | 10 | 25 | 22 | 73.4 | 390 |
| 12 | 10 | 25 | 22 | 88.0 | 430 |
| 13 | 7 | 25 | 39 | 96.3 | 420 |
| 14 | 9 | 25 | 23 | 76.7 | 230 |
| 15 | 9 | 25 | 23 | 76.7 | 230 |
| 16 | 8 | 28 | 21 | 84.0 | 228 |
| 17 | 9 | 24 | 25.5 | 85.0 | 315 |
| 18 | 10 | 25 | 15.5 | 77.5 | 150 |
| 19 | 9 | 25 | 29 | 82.9 | 315 |
| 20 | 1 | 15 | 80 | 47.5 | 100 |

In the Typical Composition portion of Table 1, the amino oxysilane is Dow Corning Z6020 resin (n-(trimethoxysilylpropyl) ethylenediamine). Metal silicate A is an aqueous metal silicate solution comprising approximately 30 percent by weight DuPont Potassium Silicate 30 (potassium silicate) and approximately 70 percent by weight water. Metal silicate B is an aqueous metal silicate solution comprising approximately 40 percent by weight DuPont Polysilicate 48 (lithium silicate) and approximately 60 percent by weight water.

In the Physical Properties portion of Table 1 the stability percentage is measured by the percent change (increase or decrease) from the initial viscosity after one month. The water insolubility test measures the amount of time in minutes after the composition is applied that cure is complete and the composition is no longer water soluble.

Although but a few examples of compositions for forming a water-borne polysiloxane binder according to this invention has been described, many variations will be apparent to those skilled in the art. Since many such variations may be made, it is to be understood that within the scope of the following claims, this invention may be practiced otherwise than specifically described.

What is claimed is:

1. A polysilicate binder composition prepared by combining:
   at least one water soluble metal silicate selected from the group consisting of alkali metal silicates and alkaline-earth metal silicates;
   a water soluble amino oxysilane having at least one primary amine group, the water soluble amino oxysilane has the general formula $(NH_2)_{x1}-[R-Si-(OR')_{x2}]_{x3}$ where R is a saturated or unsaturated hydrocarbon group containing up to 12 carbon atoms and the where R' group comprises an alkyl group selected from the group consisting of methyl, ethyl and n-propyl groups, and where $x_1$, $x_2$, and $x_3$ are in the range of from to 1 to 3, wherein the binder composition comprises in the range of from 5 to 15 percent by weight amino oxysilane; and
   water.

2. A polysilicate binder composition as recited in claim 1 wherein the water soluble metal silicate has the general formula

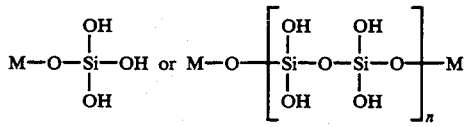

where M represents an alkali metal or alkaline-earth metal cation bonded to at least one silicate unit, and where n is in the range of from 1 to 7.

3. A polysilicate binder composition as recited in claim 2 wherein M comprises an alkali metal selected from the group consisting of lithium, potassium, and sodium.

4. A polysilicate binder composition as recited in claim 3 wherein the water soluble metal silicate comprises potassium silicate.

5. A polysilicate binder composition as recited in claim 1 wherein the binder composition comprises in the range of from 20 to 35 percent by weight water soluble metal silicate.

6. A polysilicate binder composition as recited in claim 1 wherein the water soluble metal silicate has the general formula

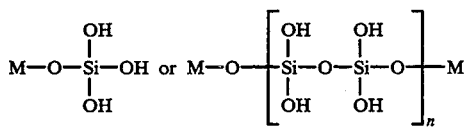

where n is in the range of from 1 to 7 and where M comprises an alkali metal selected from the group consisting of lithium, potassium, and sodium and is present in the range of from 20 to 35 percent by weight of the binder composition.

7. A polysilicate binder composition comprising:
at least one water soluble metal silicate selected from the group consisting of alkali metal silicates and alkaline-earth metal silicates;
a water soluble amino oxysilane having at least one primary amine group; and
water in the range of from 50 to 75 percent by weight of the total binder composition.

8. A method for forming a protective binder composition by combining and polymerizing in water;
an amino oxysilane having at least one primary amine group to control pH and water solubility, the amino oxysilane comprising a saturated or unsaturated hydrocarbon group containing up to 12 carbon atoms, and having multiple hydrolyzable side groups selected from the group consisting of alkyl, aryl, alkaryl, alkoxy and alkoxyalkyl groups having from 1 to 6 carbon atoms, where the number of repeating units of the oxysilane is in the range of from 1 to 3, wherein the binder composition comprises in the range of from 5 to 15 percent by weight amino oxysilane; and
at least one metal silicate comprising a cation from the group consisting of alkali metals and alkaline-earth metals, the metal silicate having multiple hydroxy side groups to facilitate polymerization, wherein the binder composition comprises in the range of from 20 to 35 percent by weight metal silicate and in the range of from 50 to 75 percent by weight water.

9. A method for forming a protective binder composition as recited in claim 8 wherein the R' group comprises an alkyl group selected from the group consisting of methyl, ethyl and n-propyl groups.

10. A method for forming a protective binder composition comprising the steps of:
hydrolyzing a water soluble amino oxysilane comprising n-(trimethoxysilylpropyl) ethylenediamine present in the range of from 5 to 15 percent by weight of the binder composition, the hydrolysis reaction forming an alcohol and a hydroxy-substituted amino oxysilane;
polymerizing the water soluble amino oxysilane and hydroxy-substituted amino oxysilane to form an amino siloxane polymer;
combining the amino siloxane polymer with at least one water soluble metal silicate; and
polymerizing the amino siloxane polymer and the water soluble metal silicate to form a three dimensional interlinked polysiloxane binder network.

11. A method for forming a protective binder composition comprising the steps of:
hydrolyzing a water soluble amino oxysilane having the general formula

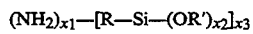

where R is a saturated or unsaturated hydrocarbon group containing up to 12 carbon atoms and where R' is independently selected from the group consisting of alkyl, aryl, alkaryl, alkoxy or alkoxyalkyl groups having 1 to 6 carbons and where $x_1$, $x_2$, and $x_3$ are in the range of from 1 to 3, the hydrolysis reaction forming an alcohol and a hydroxy substituted amino oxysilane;
polymerizing the water soluble amino oxysilane and hydroxy substituted amino oxysilane to form an amino siloxane polymer;
combining the amino siloxane polymer with at least one water soluble metal silicate selected from the group consisting of potassium silicate and lithium silicate; and
polymerizing the amino siloxane polymer and the water soluble metal silicate to form a three dimensional interlinked polysiloxane binder network, wherein the binder mixture comprises in the range of from 5 to 15 percent by weight amino oxysilane, in the range of from 20 to 35 percent by weight metal silicate and in the range of from 50 to 75 percent by weight water.

12. A method for protecting a surface against weathering or chemical attack comprising the steps of:
combining (i) water soluble amino oxysilanes having the formula

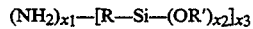

where R is a saturated or unsaturated hydrocarbon group containing up to 12 carbon atoms and where R' is independently selected from the group consisting of alkyl, aryl, alkaryl, alkoxy or alkoxyalkyl groups having 1 to 6 carbons and where $x_1$, $x_2$, and $x_3$ are in the range of from to 1 to 3; (ii) water soluble metal silicates of the formula

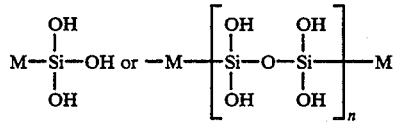

where M represents an alkali metal or alkaline-earth metal selected from the group consisting of potassium, lithium and sodium, and where n is in the range of from 1 to 7; (iii) water; and
applying the resulting composition to a surface to be treated wherein the amino oxysilanes and metal silicates undergo hydrolysis and copolymerize to form a three dimensional interlinked polysiloxane network on the surface, wherein the water soluble metal silicates are combined with the amino oxysilane in the weight ratio of from 2:1 to 7:1.

13. A method for protecting a surface against weathering or chemical attack comprising the steps of:
combining (i) water soluble metal silicates selected from the group consisting of potassium silicate and lithium silicate; (ii) water soluble amino oxysilane comprising n-(trimethoxysilylpropyl) ethylenediamine, wherein the metal silicate and amino oxysilane is present in the weight ratio of approximately 5:1; (iii) water; and applying the resulting composition to a surface to be treated wherein the amino oxysilanes and metal silicates undergo hydrolysis and copolymerize to form a three dimensional interlinked polysiloxane network on the surface.

14. A protective polysiloxane binder composition prepared by combining:

a amino oxysilane comprising n-(trimethoxysilylpropyl) ethylenediamine, the binder composition comprising approximately 5 percent by weight n-(trimethoxysilylpropyl) ethylenediamine;

at least one metal silicate having the general formula

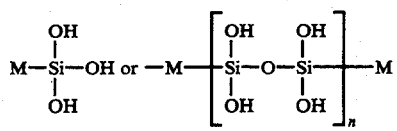

where M is a alkali metal from the group consisting lithium, potassium and sodium, and where n is in the range of from 1 to 7, in the range of from 20 to 35 percent by weight; and water in the range of from 50 to 75 percent by weight.

15. The protective binder composition as recited in claim 14 wherein the binder composition comprises approximately 25 percent by weight potassium silicate.

16. The protective binder composition as recited in claim 15 wherein the binder composition comprises approximately 60 percent by weight water.

17. A polysilicate binder composition for weather and chemical resistant protective coatings, the binder comprising:

at least one water soluble metal silicate having the general formula

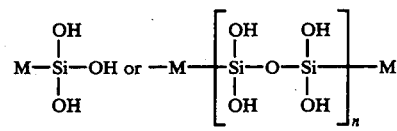

where M represents an alkali metal or alkaline-earth metal selected from the group consisting of potassium, lithium and sodium, and where n is in the range of from 1 to 7;

a water soluble amino oxysilane comprising at least one primary amine group and having the general formula

$(NH_2)_{x1}-[R-Si-(OR')_{x3}$ where R is a saturated or unsaturated hydrocarbon group containing up to 12 carbon atoms and where the R' group comprises an alkyl group selected from the group consisting of methyl, ethyl and n-propyl groups present in the range of from 5 to 15 percent by weight of the binder mixture; and water.

18. A polysilicate binder composition as recited in claim 17 wherein the binder mixture comprises in the range of from 20 to 35 weight percent metal silicate.

19. A polysilicate binder composition as recited in claim 18 wherein the binder mixture comprises in the range of from 50 to 75 percent by weight water.

* * * * *